United States Patent
Fang et al.

(10) Patent No.: US 12,414,149 B2
(45) Date of Patent: Sep. 9, 2025

(54) PRIORITIZED SERVICE PERIOD FOR TIME SENSITIVE TRANSMISSIONS

(71) Applicant: MediaTek Singapore Pte. Ltd., Singapore (SG)

(72) Inventors: Yonggang Fang, San Jose, CA (US); James Chih-Shi Yee, San Jose, CA (US); Chien-Fang Hsu, Hsinchu (TW); Kai Ying Lu, San Jose, CA (US)

(73) Assignee: MediaTek Singapore Pte. Ltd., Singapore (SG)

(*) Notice: Subject to any disclaimer, the term of this patent is extended or adjusted under 35 U.S.C. 154(b) by 309 days.

(21) Appl. No.: 17/880,544

(22) Filed: Aug. 3, 2022

(65) Prior Publication Data
US 2023/0051808 A1 Feb. 16, 2023

Related U.S. Application Data

(63) Continuation-in-part of application No. 17/734,982, filed on May 2, 2022.
(Continued)

(51) Int. Cl.
*H04W 72/12* (2023.01)
*H04W 52/02* (2009.01)
(Continued)

(52) U.S. Cl.
CPC ..... *H04W 72/569* (2023.01); *H04W 52/0248* (2013.01); *H04W 72/52* (2023.01); *H04W 72/543* (2023.01); *H04W 74/0875* (2013.01)

(58) Field of Classification Search
CPC ........... H04W 72/569; H04W 52/0248; H04W 72/52; H04W 72/543; H04W 74/0875; H04W 74/006; H04W 84/12; H04W 74/06
See application file for complete search history.

(56) References Cited

U.S. PATENT DOCUMENTS 11,711,848 B2 * 7/2023 Ghosh ............... H04W 74/0816
370/329
2018/0192444 A1 7/2018 Park et al.
(Continued)

FOREIGN PATENT DOCUMENTS

CN 106413112 A 2/2017
CN 109792776 A 5/2019
(Continued)

OTHER PUBLICATIONS

Adame; et al. "Time Sensitive Networking in IEEE 802.11 be: On the Way to Low-latency WiFi 7." Journal. Nov. 26, 2020. 8 pp.
(Continued)

*Primary Examiner* — Jay P Patel

(57) ABSTRACT

Embodiments of the present invention provide A TID-based RTWT SP that can be configured for either trigger-based transmission or EDCA-based transmission for time sensitive traffic to reduce the chance of contention/collision on time sensitive traffic caused by non-time sensitive traffic using an EDCA mechanism. This can also reduce the chance of contention on time sensitive traffic when both trigger-based transmission and EDCA-based-transmission are used in the same TID-based RTWT SP. The AP MLD can dynamically adjust the schedule of TID-SPs for ether trigger-based or EDCA-based transmission and announce the new schedule of the TID-SPs according to the requirements of time sensitive traffic and/or traffic load condition, and can prioritize time sensitive transmission to meet QoS requirements.

15 Claims, 4 Drawing Sheets

Related U.S. Application Data

(60) Provisional application No. 63/231,813, filed on Aug. 11, 2021.

(51) Int. Cl.
*H04W 72/52* (2023.01)
*H04W 72/543* (2023.01)
*H04W 72/566* (2023.01)
*H04W 74/08* (2009.01)

(56) References Cited

U.S. PATENT DOCUMENTS

| | | | |
|---|---|---|---|
| 2020/0025989 A1 | 1/2020 | Mukai et al. | |
| 2020/0267636 A1 | 8/2020 | Cavalcanti | |
| 2021/0007168 A1 | 1/2021 | Asterjadhi et al. | |
| 2021/0029741 A1* | 1/2021 | Ghosh | H04W 74/0816 |
| 2021/0099212 A1 | 4/2021 | Huang | |
| 2021/0250848 A1 | 8/2021 | Seok | |
| 2021/0329500 A1* | 10/2021 | Cariou | H04W 74/002 |
| 2022/0132608 A1 | 4/2022 | Chu | |
| 2023/0103810 A1 | 4/2023 | Kim | |
| 2023/0345349 A1 | 10/2023 | Kim | |
| 2023/0389000 A1* | 11/2023 | Dong | H04W 56/0045 |
| 2024/0032089 A1 | 1/2024 | Chitrakar | |

FOREIGN PATENT DOCUMENTS

| | | | | |
|---|---|---|---|---|
| CN | 112492698 A | | 3/2021 | |
| EP | 4231740 A1 | * | 8/2023 | H04W 56/0045 |
| WO | 2021080264 A1 | | 4/2021 | |
| WO | WO-2022077241 A1 | * | 4/2022 | H04W 56/0045 |

OTHER PUBLICATIONS

Hu; et al. Restricted TWT Spec Text Resolving TBDs: Part I. doc.: IEEE 802.11-21/462. IEEE P802.11 Wireless LANs. Apr. 23, 2021.

Struye; et al. Towards Ultra-Low-Latency mmWAVE WIFi for Multi-User Interactive Virtual Reality; Antwerp, Belgium; Aug. 2020 7 pp.

Cena et al; A Fixed-Priority Access Scheme for Industrioal Wi-Fi Networks; IEEE; 2016; 6 pages.

802 11 Working Group of the LAN/MAN Standards Committee of the IEEE Computer Society: IEEE Draft; Draft P802.11AX_D5.I, IEEE-SA, Piscataway, NJ USA, vol. 802.llax drafts, No. D5.1 Nov. 6, 2019 (Nov. 6, 2019), pp. 1-770, XP068155342, Retrieved from the Internet: URL:http://www.ieee802.org/11/private/Draft_Standards/llax/Draft%20P802.llax_D5.1.pdf [retrieved on Nov. 6, 2019] p. 387, line 49-line 50*.

802 11 Working Group of the LAN/MAN Standards Committee of the IEEE Computer Society: "Draft Standard for Information technology—Tele-communications and information exchange between systems Local and metropolitan area networks—Specific requirements?? Part 11: Wireless LAN Medium Access Control? (MAC) and Physical Layer (PHY) Specifications?? Amendment 8: Enhancements for extre",IEEE Draft; Draft P802.11BE_DI.01, IEEE-SA, Piscataway, NJ USA vol. 802.llbe drafts, No. DI.01 Jun. 30, 2021 (Jun. 30, 2021), p. 1-657.

* cited by examiner

PRIORITIZED SERVICE PERIOD FOR TIME SENSITIVE TRANSMISSIONS

CROSS-REFERENCE TO RELATED APPLICATIONS

This application is a continuation in part and claims the benefit of and priority to co-pending patent application Ser. No. 17/734,982, with filing date May 2, 2022, by Yonggang Fang, et al., and to provisional patent application Ser. No. 63/231,813, with filing date Aug. 11, 2021, by Yonggang Fang, et al., both of which are hereby incorporated by reference in their entirety.

FIELD

Embodiments of the present invention generally relate to the field of wireless communications. More specifically, embodiments of the present invention relate to systems and methods of communication in wireless time sensitive networks.

BACKGROUND

Modern electronic devices typically send and receive data with other electronic devices wirelessly using Wi-Fi, and many of these electronic devices are "dual band" devices that include at least two wireless transceivers capable of operating in different frequency bands, e.g., 2.4 GHz, 5 GHz, and 6 GHz. In most cases, a wireless device will communicate over only a single band at a time. For example, older and low-power devices, e.g., battery powered devices, often operate on the 2.4 GHz band. Newer devices and devices that require greater bandwidth often operate on the 5 GHz band. The availability of the 6 GHz band is a recent advancement and can provide higher performance, lower latency, and faster data rates.

The use of a single band may not satisfy the bandwidth or latency needs of certain devices. Therefore, some developing approaches to wireless communication increase communication bandwidth by operating on multiple bands concurrently (technically called link aggregation or multi-link operation). Advantageously, multi-link operations can provide higher network throughput and improved network flexibility compared to traditional techniques for wireless communication.

Additionally, some networks operate using special timing requirements for time-sensitive transmission of data in deterministic networks. For example, time-sensitive networking (TSN) is a set of standards that defines requirements of time synchronization, scheduling and traffic shaping, and communication path selection, reservation, and fault tolerance to introduce the concept of "time" for network communication. Examples of TSN use cases include control networks that receive inputs from sensors, perform control loop processing, and initiate actions, safety-critical networks that implement packet and link redundancy, and mixed media networks that handle data with varying levels of timing sensitivity and priority, such as vehicle networks that support climate control, infotainment, body electronics, driver assistance, etc. TSN standards serve as the foundation for deterministic networking to satisfy the common requirements of these applications. TSN can provide timing synchronization of network entities in the TSN network. TSN also provides a mechanism of frame replication and elimination for reliable transmission.

Heretofore, TSN standards have been implemented as a link layer technology on wired networks, like Ethernet. An approach to time-sensitive communication incorporated with TSN standards for wireless devices is desired.

SUMMARY

What is needed is an approach to time-sensitive communication leveraging TSN standards that can be used to communicate over wireless networks, including wireless communications over multiple wireless links by multi-link devices (MLDs). Wireless Local Area Network (WLAN) integrated or interworking with TSN can advantageously make the timing of APs synchronized in an extended service set (ESS). Moreover, as transmission failure rate in WLAN can highly impact time sensitive applications, a TSN transmission mechanism can improve transmission reliability using duplicating transmission over one or more links and/or one or more APs.

Accordingly, embodiments of the present invention provide systems, devices and methods of wireless communications that improve transmission reliability for time sensitive traffic over multiple wireless communication links in a wireless TSN. The transmitting device can be configured for uplink QoS data transmission according to transmission QoS information (e.g., a traffic profile) received from a TSN configuration server or from an application running on the transmitting device. Embodiments of the present invention provide a traffic identifier (TID) based restricted target wake time (RTWT) service period (SP) that can be configured for either trigger-based transmission or EDCA-based transmission for time sensitive traffic or priority traffic to reduce the chance of contention/collision on time sensitive traffic or priority traffic caused by non-time sensitive traffic using an EDCA mechanism. This can also reduce the chance of contention on time sensitive traffic when both trigger-based transmission and EDCA-based-transmission are used in the same TID-based RTWT SP (TID-SP). The AP MLD can dynamically adjust the schedule of TID-SPs for ether trigger-based or EDCA-based transmission according to the requirements of time sensitive traffic and/or traffic load condition, and can prioritize time sensitive transmission to meet QoS requirements.

According to one embodiment, a method of wireless data transmission in a wireless time sensitive network (TSN) by a wireless TSN-capable access point (AP) multi-link device (MLD) is disclosed. The method includes scheduling a TID-SP for performing time sensitive transmission with a wireless station (STA) MLD, transmitting a broadcast restricted target wake time (RTWT) element including the TID-SP in a beacon frame, and receiving data during the TID-SP from an STA affiliated with the STA MILD.

According to some embodiments, the method includes adjusting a schedule of the TID-SP according to a requirement concerning at least one of a time sensitive transmission and a traffic load condition, and announcing a new schedule of the TID-SP.

According to some embodiments, the scheduling a TID-SP includes scheduling a TID-SP for enhanced distributed channel access (EDCA) transmission.

According to some embodiments, the scheduling a TID-SP includes scheduling a TID-SP for trigger-based (TB) transmission.

According to some embodiments, the method includes dynamically changing the schedule of TID-SP to enhanced distributed channel access transmission.

According to some embodiments, the method includes dynamically changing the schedule of TID-SP to trigger-based transmission.

According to some embodiments, the method includes receiving an indication of RTWT TID-SP capability from the STA during an association process.

According to some embodiments, the method includes receiving a target wake time (TWT) Setup Request including an SP type and TID information for establishing RTWT SP of the TID, in the SP type includes at least one of trigger-based transmission of the TID and enhanced distributed channel access-based transmission of the TID.

According to some embodiments, the method includes transmitting a target wake time (TWT) setup response including SP type, and TID information and transmission parameters to confirm a restricted TWT (RTWT) TID-SP.

According to some embodiments, the method includes prioritizing a time sensitive transmission to meet a quality of service (QoS) requirement.

According to another embodiment, a method of wireless data transmission in a wireless time sensitive network (TSN) by a wireless station (STA) multi-link device (MLD) is disclosed. The method includes receiving a restricted target wake time (RTWT) element including the TID-SP in a beacon frame from an AP MLD, in the AP MLD schedules a TID-SP for performing time sensitive transmission, and transmitting data during the TID-SP to the AP MLD.

According to some embodiments, the method includes the transmitting data during the TID-SP to the AP MLD includes receiving a trigger frame in the trigger based TID-SP, performing a trigger-based (TB) response, and transmitting a TB physical layer protocol data unit (PPDU) including a MAC Service Data Unit (MSDU) including a TID permitted in the TID-SP.

According to some embodiments, the method includes transmitting data during the TID-SP to the AP MLD includes performing enhanced distributed channel access (EDCA) or priority EDCA to acquire a wireless medium of the wireless network, and transmitting a PPDU including a MAC Service Data Unit (MSDU) including a TID equal to a TID permitted in the TID-SP.

According to some embodiments, the method includes transmitting an indication of RTWT TID-SP capability to the AP during an association process.

According to some embodiments, the method includes transmitting a target wake time (TWT) Setup Request including an SP type and TID information for establishing an RTWT SP of a TID, in the SP type includes at least one of trigger-based transmission of the TID and enhanced distributed channel access-based (EDCA) transmission of the TID.

According to some embodiments, the method includes receiving a target wake time (TWT) setup response including SP type, TID information and transmission parameters to confirm a restricted TWT (RTWT) TID-SP.

According to some embodiments, the method includes performing priority enhanced distributed channel access (EDCA) for channel access and transmitting a PPDU including a MAC Service Data Unit (MSDU) including a TID permitted for the TID-SP in the TID-SP is not scheduled for the STA affiliated with the STA MLD.

According to a different embodiment, an apparatus for wireless data transmission in a wireless time sensitive network by a wireless access point multi-link device is disclosed. The apparatus includes a processor, a memory coupled to the processor operable to store data, and a plurality of radios operable to perform wireless TSN transmission. The processor is operable to schedule a TID-SP for performing time sensitive transmission with a wireless station (STA) MLD, transmit the TID-SP in target wake time (TWT) element in a beacon frame, and receive data during the TID-SP from the STA MLD.

According to some embodiments, the processor is further operable to adjust a schedule of the TID-SP, and announce the new schedule of TID-SP according to a requirement of at least one of a time sensitive transmission and a traffic load condition.

According to some embodiments, the processor is further operable to dynamically change the TID-SP to enhanced distributed channel access (EDCA) transmission and announce a new schedule of the TID-SP.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
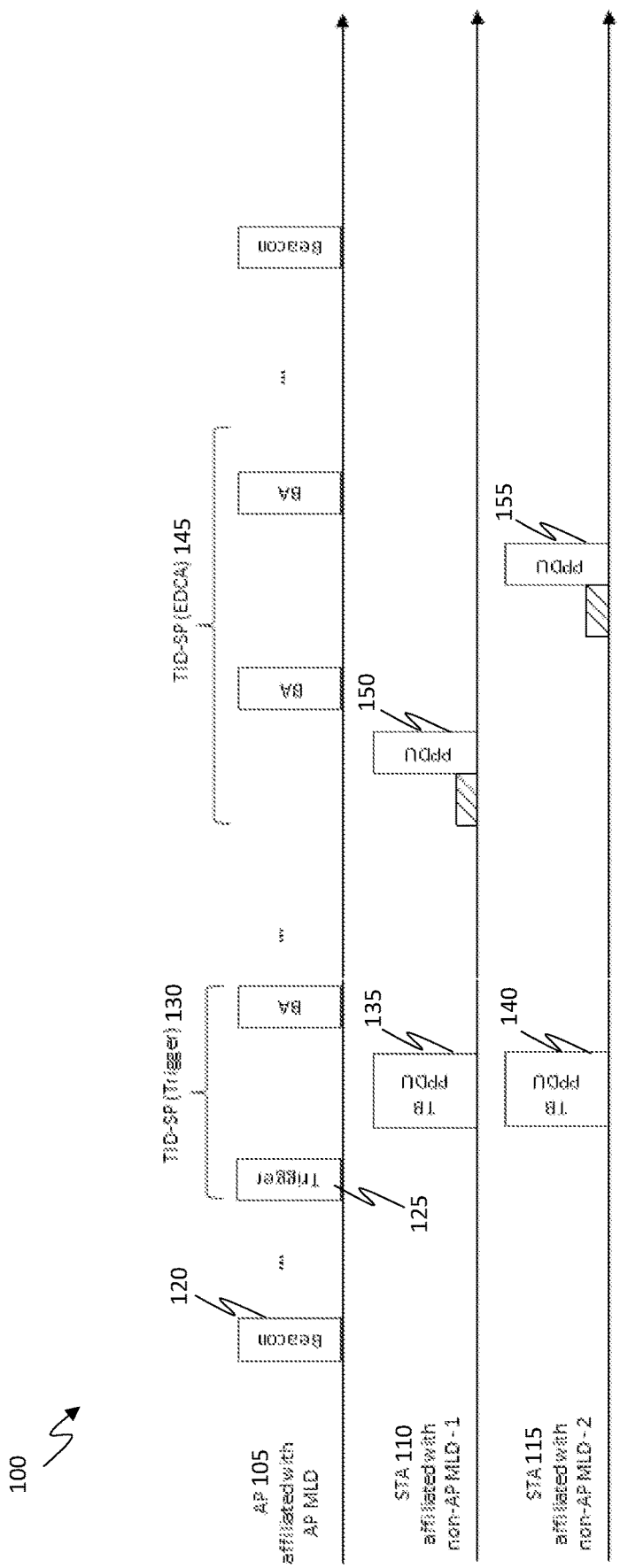
FIG. 1 is a diagram of an exemplary time sensitive transmission between multi-link devices of a wireless network according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIG. 3) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "coordinating," "storing," "transmitting," "authenticating," "identifying," "requesting," "reporting," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Prioritized Service Period

Embodiments of the present invention provide systems, devices and methods of wireless communications that perform reliable transmissions of time sensitive user data over multiple wireless communication links in a wireless time sensitive network (TSN). The transmitting device can be configured and scheduled for uplink transmission according to transmission information (e.g., a traffic profile) received from a TSN configuration server or an application running on the transmission device. A TID-based RTWT SP that can be configured for either trigger-based transmission or EDCA-based transmission for time sensitive traffic is described herein to advantageously reduce the chance of contention/collision on time sensitive traffic caused by non-time sensitive traffic using an EDCA mechanism. This can also reduce the chance of contention on time sensitive traffic when both trigger-based transmission and EDCA-based-transmission are used in the same TID-based RTWT SP. The AP MLD can dynamically adjust the schedule of TID-SPs for ether trigger-based or EDCA-based transmission and announce the schedule changes according to the requirements of time sensitive traffic and/or traffic load condition of link, and can prioritize time sensitive transmission to meet QoS requirements.

Some wireless transmissions use a target wake time (TWT) to manage activity in the wireless communication. For example, TWT can reduce medium contention between STAs, and can reduce the required amount of time that wireless devices using power-save mode are awakened from a sleep state. STAs can be scheduled to operate at non-overlapping times, and/or frequencies, and to concentrate the frame exchanges in predefined service periods (SPs).

Broadcast TWT is a method for the AP to allocate time intervals (or SPs) during which only specified STAs can communicate with the AP. Broadcast TWT SPs are uniquely identified by the <broadcast TWT ID, MAC address of TWT scheduling AP>tuple. Broadcast TWT SP are recommended for frame transmission without constraints, solicited feedback not initiated by (Uplink OFDMA random access) UORA, or solicited status and solicited feedback initiated by UORA, as well as frame transmissions without constraints (other than AP transmitting a traffic indication map (TIM) at the beginning of each TWT SP). Restricted TWT (RTWT) is a type of Broadcast TWT which only allows a certain type of traffic in the service period. Restricted TWT (RTWT) SPs are the service periods (or prioritized service periods) recommended for transmitting time sensitive traffic or priority traffic with predictable delay. The RTWT setup procedure specifies TIDs of which the time sensitive traffic or priority traffic can be served during RTWT SP. However, the RTWT setup procedure may not specify a mechanism to allow EDCA-based or priority EDCA-based UL transmission in prioritized service periods.

Trigger-based UL transmission are triggered from an AP affiliated with an AP MLD with a basic trigger variant for scheduled UL data frame transmission from one or more STAs affiliated with non-AP MLDs. This UL transmission from a STA fully relies on the scheduling of AP, and may not be sufficiently flexible for a STA to handle burst-type UL traffic in the RTWT SP. Moreover, the RTWT SP setup procedure does not separate trigger-based UL transmission from an enhanced distributed channel access (EDCA)-based UL transmission mechanism within the same RTWT SP. When both channel access mechanisms are allowed in one SP, scheduling complexity is increased which may result in reduced performance, such as increased channel access delay, power consumption for battery operated devices, etc., especially for EDCA-based UL transmissions.

Traffic ID (TID) information is a quality of service (QoS) feature that can be used by wireless devices to decide and select a UP (user priority) for prioritized QoS or a TSPEC (traffic specification) for parameterized QoS. For example, in WLAN, packets can be a stream of video, voice, or data, and each category can have a different priority. TID information can be used as an identifier to classify a packet in Wireless LAN. According to embodiments of the present invention, TID based RTWT SP restricts QoS transmissions only for specified TIDs. A scheduled STA affiliated with a non-AP MLD can use EDCA for channel access in a TID-based RTWT SP to efficiently handle burst-type UL QoS traffic in a TID-based RTWT SP.

A TID-based RTWT SP (i.e., TID-SP) can be configured for either trigger-based transmission or EDCA-based transmission for time sensitive traffic to reduce the chance of contention/collision on time sensitive traffic caused by non-time sensitive traffic using an EDCA mechanism in the TID-SP. This can also reduce the chance of contention for time sensitive traffic when both trigger-based transmission and EDCA-based-transmission are used in the same TID-SP. Moreover, the AP affiliated with the AP MLD can dynamically adjust the schedule of TID-SPs for ether trigger-based or EDCA-based transmission and announce the new schedule according to the requirements of time sensitive traffic and/or traffic load condition of the link, and can prioritize time sensitive transmission to meet QoS requirements.

TID-based RTWT SP setup can be initiated by an STA affiliated with a non-AP MLD capable of TID-SP indicating the capability of RTWT TID-SP during the association process with an AP affiliated with an AP MLD or after the association. The initiating STA sends a TWT Setup Request which carries SP type (trigger-based transmission or EDCA-based transmission) and TID information for establishing RTWT SP with the AP affiliated with the AP MLD for UL QoS transmission on the specified TID(s). The affiliated AP sends a TWT Setup Response carrying SP type, TID information and other parameters to confirm the RTWT TID-SP establishment between the STA (e.g., a scheduled STA) and the AP (e.g., a scheduled AP).

During operation, the AP schedules a TID-SP for either trigger-based (TB) transmission or EDCA-based transmission and announces a TID-SP in RTWT element carried in beacon frame. In a TID-SP for TB transmission, the AP transmits a trigger frame to initiate the TB response from the scheduled STA affiliated with non-AP MLD. The scheduled STA affiliated with the non-AP MLD that has setup TID-SP with the AP affiliated with the AP MLD performs a TB response after receiving a trigger frame in the SP associated with the TID and/or transmits a TB physical layer protocol data unit (PPDU) which carries a MAC Service Data Unit (MSDU) or Aggregate-MSDU (A-MSDU) with the TID equal to the TID permitted for this trigger-based TID-SP. For EDCA-based TID-SP, the scheduled STA performs EDCA to acquire the wireless medium and transmits a PPDU which carries an MAC Service Data Unit (MSDU) or Aggregate MSDU (A-MSDU) with a TID equal to the TID permitted in the TID-SP.

FIG. 1 is a transmission timing diagram depicting an exemplary time sensitive transmission 100 in a wireless network according to embodiments of the present invention. AP 105 is affiliated with an AP MLD capable of TID-SP transmission and schedules a TID-SP for either trigger-based transmission or EDCA-based transmission and announces the TID-SP in RTWT element carried in Beacon frame 120. AP 105 then transmits a trigger frame 125 in a trigger-based TID-SP for receipt by scheduled STAs 110 and/or 115 affiliated with non-AP MLDs capable of TID-SP transmission. Trigger frame 125 is transmitted in the SP associated with the TID to initiate the TB response from the scheduled STA(s). During a trigger-based TID-SP, the scheduled STA performs TB response and transmits TB PPDU which carries an MSDU or A-MSDU with the TID equal to the TID permitted for the TID-SP. During an EDCA-based TID-SP, the scheduled STA performs EDCA or priority EDCA to acquire the medium and transmit a PPDU which carries a MSDU (or A-MSDU) with the TID equal to the TID permitted for the TID-SP. When the priority access is enabled, an associated STA affiliated with the priority access enabled non-AP MLD can perform priority EDCA for channel access and transmit a PPDU carrying an MSDU or A-MSDU with TID permitted for the TID-SP which may not be scheduled for the STA with the priority access enabled non-AP MLD.

As depicted in FIG. 1, AP 105 can dynamically adjust the schedule of TID-SP for ether trigger-based or EDCA-based transmission and announce the new TID-SP in RTWT element carried in Beacon frames according to needs of time sensitive traffic and/or traffic load condition of the link and prioritize the time sensitive transmission to meet QoS requirements. During trigger-based TID-SP 130, scheduled STAs 110 and 115 transmit TB PPDUs 135 and 140 which carry MSDUs or A-MSDUs with the TID equal to the TID permitted for the SP. During EDCA-based TID-SP 145, scheduled STAs 110 and 115 perform EDCA to acquire the medium and transmit PPDUs 150 and 155 which carry MSDUs or A-MSDUs with the TID equal to the TID permitted for the TID-SP.

Figure 2:
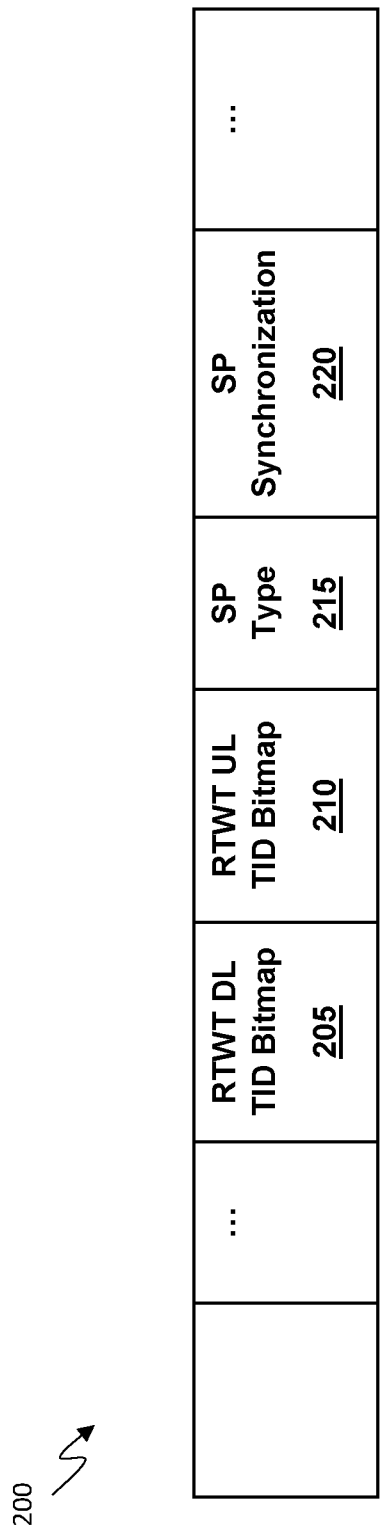
FIG. 2 is a diagram of an TID-based service period information element according to embodiments of the present invention.

FIG. 2 depicts an exemplary some information in RTWT information element (IE) format 200 according to embodiments of the present invention. The SP of RTWT inherits the mechanism of a broadcast TWT SP with certain transmission restrictions. RTWT DL TID Bitmap 205 of the RTWT element indicates the permitted TIDs for DL transmission in the RTWT SP (e.g., TID-SP). RTWT UL TID Bitmap 210 in RTWT element indicates the permitted TIDs for UL transmission in the TID-SP. SP Type 215 indicates the type of access is permitted in the Service Period. For a trigger-based SP, the AP affiliated with the AP MLD is allowed to transmit a trigger frame to initiate TB UL transmission in this SP on the corresponding link.

For an EDCA-based TID-SP, a scheduled STA affiliated with the non-AP MLD is allowed to perform EDCA or priority EDCA to transmit a PPDU carrying an MSDU (or A-MSDU) with TID equal to the TID permitted for the TID-SP. TID(s) permitted for the TID-SP for UL transmission is/are indicated in the RTWT UL TID Bitmap subfields of RTWT element. SP Synchronization Bitmap 220 (optional) can indicate whether the timing of this TID-SP is synchronized with the timing of TID-SP on other links. A bit corresponding to a link in the SP Synchronization Bitmap is set to 1 to indicate that the timing of the TID-SP on that link is synchronized with the timing of this TID-SP. Otherwise, it is not synchronized. If more than one bit of SP Synchronization Bitmap are set to "1", the non-AP MLD may perform an EDCA procedure and transmit on the corresponding links at substantially the same time.

When priority access is enabled, an associated STA affiliated with the priority access enabled non-AP MLD can perform priority EDCA for channel access and transmit a PPDU which carries an MSDU or an A-MSDU with TID permitted for the TID-SP which may be not scheduled for the STA with the priority access enabled non-AP MLD. This can provide higher priority to a priority access enabled non-AP MLD than non-priority enabled non-AP MLDs in TID-SPs of RTWT.

Figure 3:
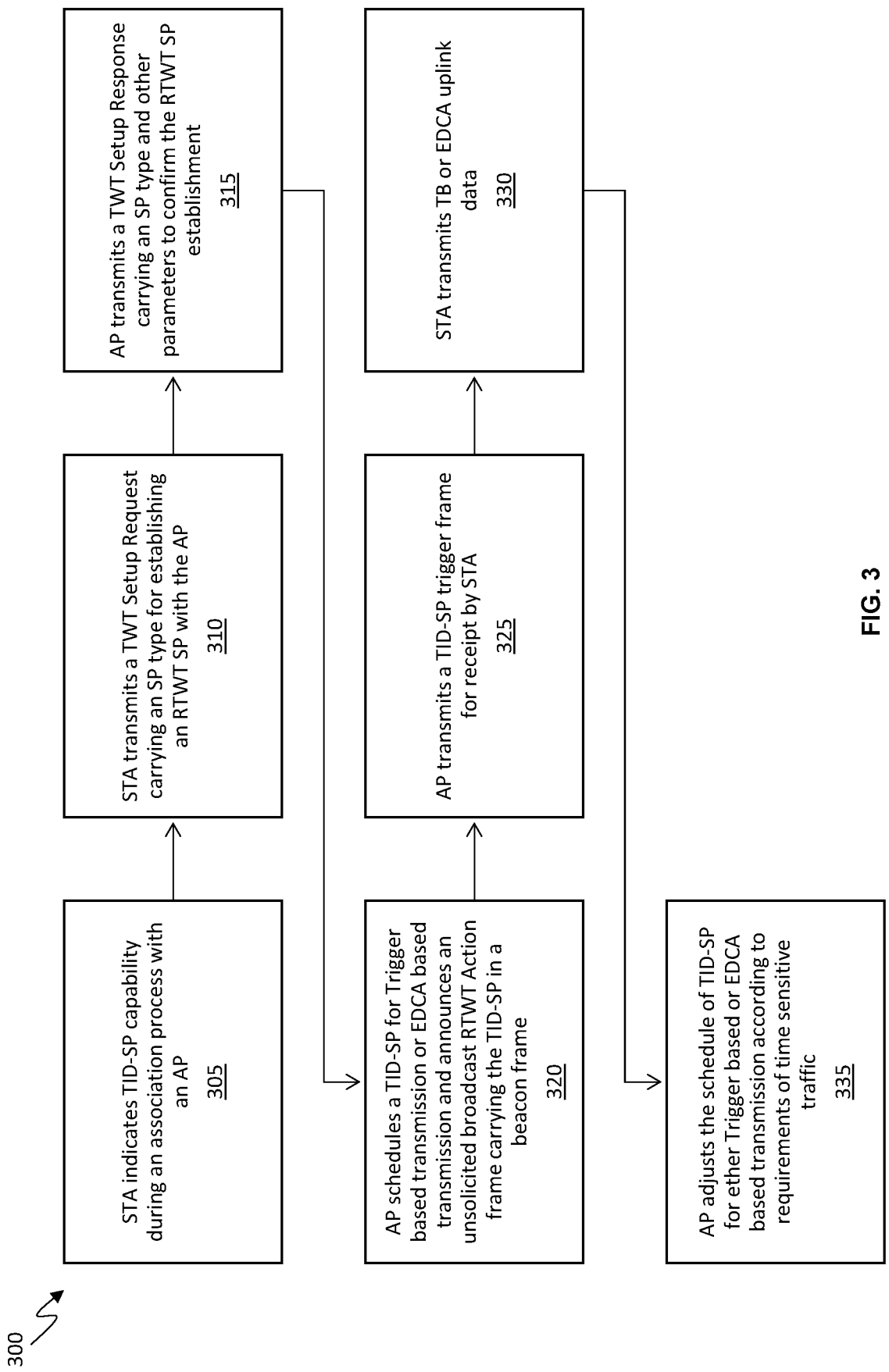
FIG. 3 is a flowchart of an exemplary process for performing time sensitive transmission during a TID-SP according to embodiments of the present invention.

FIG. 3 is a flow chart depicting an exemplary sequence of computer implemented steps of a process 300 for time sensitive transmission during a TID-SP in a wireless network according to embodiments of the present invention.

At step 305, an STA affiliated with an STA MLD capable of TID-SP transmission indicates support of RTWT TID-SP capability during an association process with an AP affiliated with an AP MLD capable of TID-SP transmission.

At step 310, the STA transmits a TWT Setup Request carrying an SP type (trigger-based transmission or EDCA-based transmission), TID information and other parameters for establishing an RTWT SP with the AP for transmitting user data with specified TIDs.

At step 315, the AP transmits a TWT Setup Response carrying an SP type (trigger-based transmission or EDCA-based transmission), TID information and other parameters to confirm the RTWT SP establishment between the scheduled STA and scheduling AP).

At step 320, the AP affiliated schedules a TID-SP for either trigger-based transmission or EDCA-based transmission and announces the TID-SP in RTWT element carried in a beacon frame. The AP can dynamically adjust the schedule of the TID-SP for ether trigger-based or EDCA-based transmission and announce the new TID-SP in RTWT element carried in Beacon frames according to the requirements of time sensitive traffic and/or traffic load condition on the link and prioritize the time sensitive transmission to meet QoS requirements.

At step 325, for trigger-based transmission, the AP transmits in a TID-SP a trigger frame for receipt by an STA of a non-AP MLD capable of TID-SP transmission. The trigger frame is transmitted in the SP associated with the TID to initiate the TB response from the responding STA.

At step 330, for trigger-based TID-SP, the scheduled responding STA performs TB response and transmits a TB PPDU which carries an MSDU or A-MSDU with the TID equal to the TID permitted for the TID-SP. For EDCA-based TID-SP, the scheduled responding STA affiliated with a non-AP MLD performs EDCA or priority EDCA to acquire the medium and transmit a PPDU which carries a MSDU (or A-MSDU) with the TID equal to the TID permitted for the TID-SP. When priority access is enabled, a STA affiliated with the priority access enabled non-AP MLD can perform priority EDCA for channel access and transmit a PPDU carrying an MSDU or an A-MSDU with TID permitted for the TID-SP which may not be scheduled for the STA with the priority access enabled non-AP MLD.

At step 335, the AP adjusts the schedule (e.g., transmission time, frequency, and duration) of the TID-SP for ether trigger-based or EDCA-based transmission according to the requirements of time sensitive traffic and/or traffic load condition and prioritize the time sensitive transmission to meet QoS requirements. The affiliated AP broadcasts the adjusted schedule of the TID-SP in an RTWT element carried in beacon frames for scheduled STAs affiliated with non-AP MLDs to transmit time sensitive or priority traffic in the TID-SPs.

Exemplary Computer Controlled System

Figure 4:
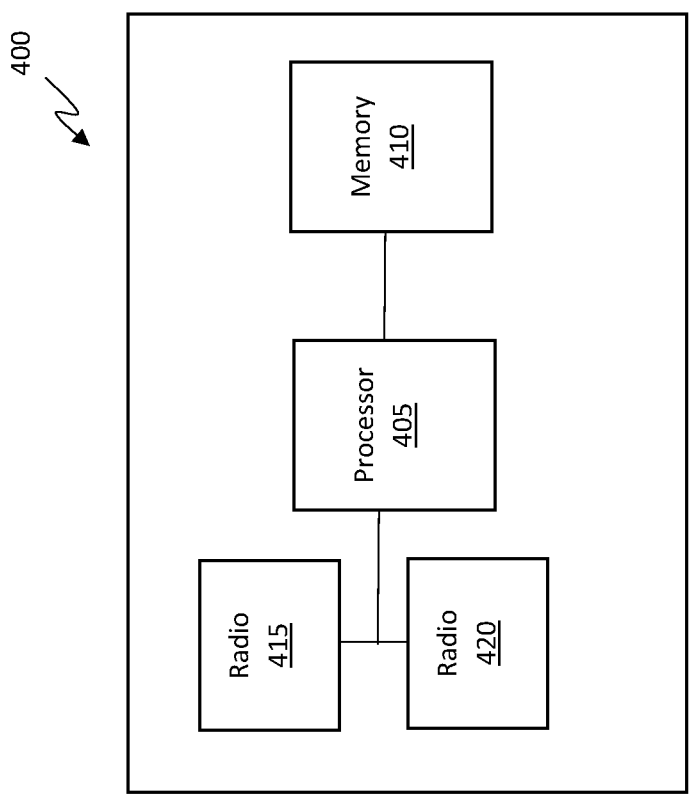
FIG. 4 is a block diagram depicting an exemplary computer system platform upon which embodiments of the present invention may be implemented.

FIG. 4 depicts an exemplary wireless device 400 upon which embodiments of the present invention can be implemented. Embodiments of the present invention are drawn to wireless devices capable of performing duplicating transmission in a wireless TSN according to embodiments of the present invention. Wireless device 400 can transmit and/or receive with trigger-based and/or EDCA-based transmission methods in a TID-SP time sensitive or priority user data in a wireless network. Moreover, wireless device 400 can dynamically adjust the schedule of TID-SPs for ether trigger-based or EDCA-based transmission and announce the adjustment according to the requirements of time sensitive traffic and/or traffic load condition, and can advantageously prioritize time sensitive transmission to meet QoS requirements.

Wireless device 400 includes a processor 405 for running software applications and optionally an operating system. Memory 410 can include read-only memory and/or random-access memory, for example, to store applications and data (e.g., tables of index values) for use by the processor 405 and data received or transmitted by radios 415 and 420. Radios 415 and 420 can communicate with other electronic devices over a wireless network (e.g., WLAN) using multiple spatial streams (e.g., multiple antennas) and typically operates according to IEEE standards (e.g., IEEE 802.11ax, IEEE 802.11ay, IEEE 802.11be, etc.). Radios 415 and 420 can perform multi-link operations including multi-link time sensitive transmissions. Wireless device 400 can include more than two radios, according to embodiments. The radios (e.g., radios 415 and 420) can be configured to transmit and/or receive data according to wireless transmission QoS requirements (e.g., a traffic profile), for example. Wireless device 400 is a wireless TSN capable device that can be configured by a TSN configuration server and scheduled by the associated AP for wireless time sensitive transmission.

Embodiments of the present invention are thus described. While the present invention has been described in particular embodiments, it should be appreciated that the present invention should not be construed as limited by such embodiments, but rather construed according to the following claims.

What is claimed is:

1. A method of wireless data transmission in a wireless time sensitive network (TSN) by a wireless TSN-capable access point (AP) multi-link device (MLD), the method comprising:
    scheduling a traffic identifier service period (TID-SP) for performing time sensitive transmission with a wireless station (STA) MLD;
    transmitting a broadcast restricted target wake time (RTWT) element comprising the TID-SP in a beacon frame;
    receiving data during the TID-SP from an STA affiliated with the STA MLD;
    adjusting a schedule of the TID-SP according to a requirement concerning at least one of:
        a time sensitive transmission; and a traffic load condition; and
    announcing a new schedule of the TID-SP; and
    dynamically changing the schedule of TID-SP to enhanced distributed channel access (EDCA) transmission or to trigger-based (TB) transmission.

2. The method of claim 1, wherein the scheduling a TID-SP comprises scheduling a TID-SP for enhanced distributed channel access (EDCA) transmission.

3. The method of claim 1, wherein the scheduling a TID-SP comprises scheduling a TID-SP for trigger-based (TB) transmission.

4. The method of claim 1, further comprising receiving an indication of RTWT TID-SP capability from the STA during an association process.

5. The method of claim 1, further comprising receiving a target wake time (TWT) Setup Request comprising an SP type and TID information for establishing RTWT SP of the TID, wherein the SP type comprises at least one of: trigger-based transmission of the TID; and enhanced distributed channel access-based transmission of the TID.

6. The method of claim 1, further comprising transmitting a target wake time (TWT) setup response comprising SP type, and TID information and transmission parameters to confirm a restricted TWT (RTWT) TID-SP.

7. The method of claim 1, further comprising prioritizing a time sensitive transmission to meet a quality of service (QOS) requirement.

8. A method of wireless data transmission in a wireless time sensitive network (TSN) by a wireless station (STA) multi-link device (MLD), the method comprising:
    receiving a restricted target wake time (RTWT) element comprising a traffic identifier service period (TID-SP) in a beacon frame from an AP MLD, wherein the AP MLD schedules the TID-SP for performing time sensitive transmission for receipt by the wireless STA MLD; and
    transmitting data during the TID-SP to the AP MLD, wherein the transmitting comprises:
        receiving a trigger frame in the trigger based TID-SP;
        performing a trigger-based (TB) response; and
        transmitting a TB physical layer protocol data unit (PPDU) comprising a MAC Service Data Unit (MSDU) with a TID permitted in the TID-SP.

9. The method of claim 8, wherein the transmitting data during the TID-SP to the AP MLD comprises:
  performing enhanced distributed channel access (EDCA) or priority EDCA to acquire a wireless medium of the wireless network; and
  transmitting a PPDU comprising a MAC Service Data Unit (MSDU) with a TID equal to a TID permitted in the TID-SP.

10. The method of claim 8, further comprising transmitting an indication of RTWT TID-SP capability to the AP during an association process.

11. The method of claim 8, further comprising transmitting a target wake time (TWT) Setup Request comprising an SP type and TID information for establishing an RTWT SP of a TID, wherein the SP type comprises at least one of: trigger-based transmission of the TID; and enhanced distributed channel access-based (EDCA) transmission of the TID.

12. The method of claim 8, further comprising receiving a target wake time (TWT) setup response comprising SP type, TID information and transmission parameters to confirm a restricted TWT (RTWT) TID-SP.

13. The method of claim 8, further comprising:
  performing priority enhanced distributed channel access (EDCA) for channel access; and
  transmitting a PPDU comprising a MAC Service Data Unit (MSDU) with a TID permitted for the TID-SP, wherein the TID-SP is not scheduled for the STA affiliated with the STA MLD.

14. An apparatus for wireless data transmission in a wireless time sensitive network (TSN) by a wireless access point (AP) multi-link device (MLD), the apparatus comprising:
  a processor;
  a memory coupled to the processor operable to store data; and
  a plurality of radios operable to perform wireless TSN transmission, and wherein the processor is operable to:
    schedule a traffic identifier service period (TID-SP) for performing time sensitive transmission with a wireless station (STA) MLD;
    transmit the TID-SP in target wake time (TWT) element in a beacon frame; and
    receive data during the TID-SP from the STA MLD;
    dynamically change the TID-SP to enhanced distributed channel access (EDCA) transmission; and
    announce a new schedule of the TID-SP.

15. The apparatus of claim 14, wherein the processor is further operable to:
  adjust a schedule of the TID-SP; and
  announce the new schedule of TID-SP according to a requirement of at least one of: a time sensitive transmission; and a traffic load condition.

* * * * *